US012808410B2

(12) United States Patent
Schweitzer

(10) Patent No.: US 12,808,410 B2
(45) Date of Patent: Nov. 24, 2026

(54) BEARING ASSEMBLY

(71) Applicant: SAFRAN AIRCRAFT ENGINES, Paris (FR)

(72) Inventor: Laurent Schweitzer, Moissy Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 284 days.

(21) Appl. No.: 18/707,702

(22) PCT Filed: Nov. 8, 2022

(86) PCT No.: PCT/FR2022/000097
§ 371 (c)(1),
(2) Date: May 6, 2024

(87) PCT Pub. No.: WO2023/084160
PCT Pub. Date: May 19, 2023

(65) Prior Publication Data

US 2026/0160295 A1 Jun. 11, 2026

(30) Foreign Application Priority Data

Nov. 9, 2021 (FR) ...................................... 2111878

(51) Int. Cl.
*F16C 19/06* (2006.01)
*F16C 19/52* (2006.01)
(Continued)

(52) U.S. Cl.
CPC .............. *F16C 39/02* (2013.01); *F16C 19/06* (2013.01); *F16C 19/522* (2013.01); *F16C 21/00* (2013.01);
(Continued)

(58) Field of Classification Search
CPC ...... F16C 19/163; F16C 19/522; F16C 21/00; F16C 39/02
See application file for complete search history.

(56) References Cited

U.S. PATENT DOCUMENTS 4,881,828 A * 11/1989 Kato ....................... F16C 19/46 384/624
4,938,610 A * 7/1990 Kato ....................... F16C 21/00 384/126
(Continued)

FOREIGN PATENT DOCUMENTS

DE 2707352 A1 * 8/1978
DE 102006029151 A1 * 3/2007 ........... F16C 19/522
(Continued)

OTHER PUBLICATIONS

DESCRIPTION_102006029151A1.*
(Continued)

*Primary Examiner* — Phillip A Johnson
(74) *Attorney, Agent, or Firm* — Cozen O'Connor

(57) ABSTRACT

A bearing assembly includes a shaft having an axis of rotation and a hub mounted around the shaft. The bearing also includes a bearing having an inner bearing race attached to the shaft, an outer bearing race attached to the hub, rolling elements arranged between the inner bearing race and the outer bearing race, and a protective device suitable for protecting the bearing from overloads. The protective device includes a first ring and a second ring borne by a support from among the shaft and the hub, the first ring being arranged at a distance from the second ring when the bearing assembly is subjected to a load lower than a threshold load; the first ring making contact with the second ring when the bearing assembly is subjected to a load higher than said threshold load.

18 Claims, 2 Drawing Sheets

(51) Int. Cl.
*F16C 21/00* (2006.01)
*F16C 39/02* (2006.01)

(52) U.S. Cl.
CPC ...... *F16C 2202/06* (2013.01); *F16C 2202/08* (2013.01); *F16C 2204/60* (2013.01); *F16C 2206/40* (2013.01); *F16C 2208/32* (2013.01); *F16C 2226/60* (2013.01)

(56) References Cited

U.S. PATENT DOCUMENTS

| | | | |
|---|---|---|---|
| 5,642,944 | A | 7/1997 | Dublin, Jr. et al. |
| 6,420,809 | B1 | 7/2002 | Obara |

FOREIGN PATENT DOCUMENTS

| | | | | | |
|---|---|---|---|---|---|
| EP | 1071888 | B1 | | 8/2005 | |
| EP | 1565663 | B1 | | 4/2010 | |
| JP | 2016089904 | A | * | 5/2016 | .............. F16C 39/02 |
| WO | 2014122719 | A1 | | 8/2014 | |

OTHER PUBLICATIONS

International Search Report in corresponding International Patent Application No. PCT/FR2022/000097, mailed Jan. 9, 2023, English Translation, 2 pages.

* cited by examiner

BEARING ASSEMBLY

CROSS-REFERENCE TO RELATED APPLICATIONS

This application is a US National phase Application of PCT/FR2022/000097 filed Nov. 8, 2022, which claims priority to French Patent Application No. 2111878 filed Nov. 9, 2021, both of which are hereby incorporated in their entirety.

TECHNICAL FIELD OF THE INVENTION

The present invention relates to bearing assemblies. In particular, the invention relates to roller bearings and more specifically to low-speed roller bearings subjected to occasional extreme loads.

BACKGROUND

Roller bearings are generally used to ensure the precise axial and radial positioning of shafts integral with parts that are to be positionally oriented or slowly rotated. These roller bearings are composed of an inner bearing race presenting a rolling track, that may or may not be divided into two half races, each bearing a half-track; an outer bearing race presenting a rolling track, that may or may not be divided into two half races, each bearing a half-track; rolling elements that may be balls or rollers and possibly one or more rolling element separating devices aiming to ensure good circumferential distribution of the elements in the bearing. The rolling elements may be balls, cylindrical rollers, tapered rollers or barrel-shaped rollers.

The roller bearings involve geometries with Hertzian contacts such as ball/tracks having the shape of torus portions, cylindrical roller/cylindrical tracks, tapered roller/tapered tracks or barrel-shaped roller/spherical and toroidal tracks. These geometries tend to concentrate the contact force onto very reduced surfaces. During very heavy loading at a given position or at a very low speed, the contact pressures between the rolling elements and the tracks may exceed the elastic limit of the materials of the tracks or rolling elements, altering their geometries by brinelling. This brinelling degrades proper rolling by creating points of resistance or even play. This is called the Brinell effect.

In order to prevent this type of deterioration, roller bearings are dimensioned to take extreme loads into consideration, even if these loads are rare. Many roller bearings are therefore overdesigned for the vast majority of their life cycle.

These overdesigned roller bearings are heavy, bulky and costly.

SUMMARY

One object of the present invention is to propose a bearing assembly that better resists occasional overloading.

Another object of the present invention is to propose a bearing assembly that does not present points of resistance or clearances following an occasional extreme load event.

Another object of the present invention is to propose a bearing assembly that is lighter while being capable of supporting heavy loads.

Another object of the present invention is to propose a bearing assembly that is less bulky and capable of supporting heavy loads.

Another object of the present invention is to propose a less costly bearing assembly.

The object of the present invention is a bearing assembly comprising:

a shaft having an axis of rotation extending along an axial direction, a hub mounted around the shaft, a bearing comprising an inner bearing race attached to the shaft, an outer bearing race attached to the hub, and rolling elements arranged between the inner bearing race and the outer bearing race, a protective device suitable for protecting the bearing from overloading, the protective device comprising at least one first ring and one second ring which are borne by at least one support from among the shaft and the hub, the first ring being arranged at a distance from the second ring when the bearing assembly is subjected to a load lower than a threshold load; at least one part of the first ring making contact with at least one part of the second ring when the bearing assembly is subjected to a load higher than said threshold load.

Advantageously, the invention allows reducing the overdesigning of or the damage to slewing bearings or thrust bearings due to extreme loadings seen during rare events in the life cycle of the bearing.

The features specified in the following paragraphs may, optionally, be implemented. The features may be implemented independently from each other or in combination with each other:

The first ring comprises an inner ring attached to the shaft, the second ring comprising an intermediate ring, and the assembly also comprises an outer ring borne by the hub, the intermediate ring being arranged between and at a distance from the inner ring and from the outer ring when the bearing assembly is subjected to a load lower than a threshold load; the intermediate ring making contact with at least one part of at least one ring from among the inner ring and the outer ring when the bearing assembly is subjected to a load higher than said threshold load.

The inner bearing race, the outer bearing race and the rolling elements are made of a first material having a first stiffness, and the inner ring, the outer ring and the intermediate ring are made of a second material that is different from the first material, the second material presenting a second stiffness that is greater than the first stiffness of the first material at least along the radial direction, the radial direction being perpendicular to the axial direction.

The first stiffness of the first material allows for the deformation of the rolling elements and/or of the at least one race from among the inner bearing race and the outer bearing race, within their elastic deformation range, at least until at least one part of the intermediate ring makes contact with one from among the inner ring and the outer ring.

The intermediate ring presents at least one circular face with a frustoconical shape, and the inner ring and the outer ring present a supporting face facing the intermediate ring, said supporting face having a shape complementary to the shape of the intermediate ring.

The intermediate ring is composed of several ring segments in the shape of a circular arc, separated from each other by gaps. Preferably, springs or inserts of an elastic material maintain a regular spacing between these segments.

The assembly comprises at least one support suitable for bearing the intermediate ring, the support being attached to one among the shaft and the hub, and an elastic element suitable for acting between the support and the intermediate ring, the elastic element being configured to maintain the intermediate ring at a position defined along the axial direction.

Advantageously, the support and the elastic element maintain the clearance between the intermediate ring and the inner ring and the clearance between the intermediate ring and the outer ring.

The intermediate ring comprises rounded edges, for example, edges presenting the shape of a logarithmic profile or of a clothoid profile.

Advantageously, these edges allow reducing excess edge pressure.

The intermediate ring comprises at least one groove situated on at least one face from among a face facing the inner ring and a face facing the outer ring, the groove extending in a plane perpendicular to the axial direction.

The groove comprises a third material having a third stiffness that is lower than the second stiffness of the second material, said third material being, for example, polytetrafluoroethylene.

The groove comprises a leaf spring.

The inner bearing race, the outer bearing race and the rolling elements are made of a superelastic alloy, and the inner ring, the outer ring and the intermediate ring are made of a material from among a steel and a ceramic.

The inner bearing race, the outer bearing race and the rolling elements are made of a steel, and the inner ring, the outer ring and the intermediate ring are made of a ceramic.

The inner bearing race and respectively the outer bearing race of the bearing are contiguous along the axial direction with the inner ring and respectively the outer ring of the protective device.

The support comprises a nut equipped with a flange extending in a cantilevered manner between the shaft and the hub, the nut being suitable for attaching a ring from among the outer ring and the inner ring in abutment against a bearing race from among the outer bearing race and the inner bearing race.

DETAILED DESCRIPTION OF THE INVENTION

Figure 1:
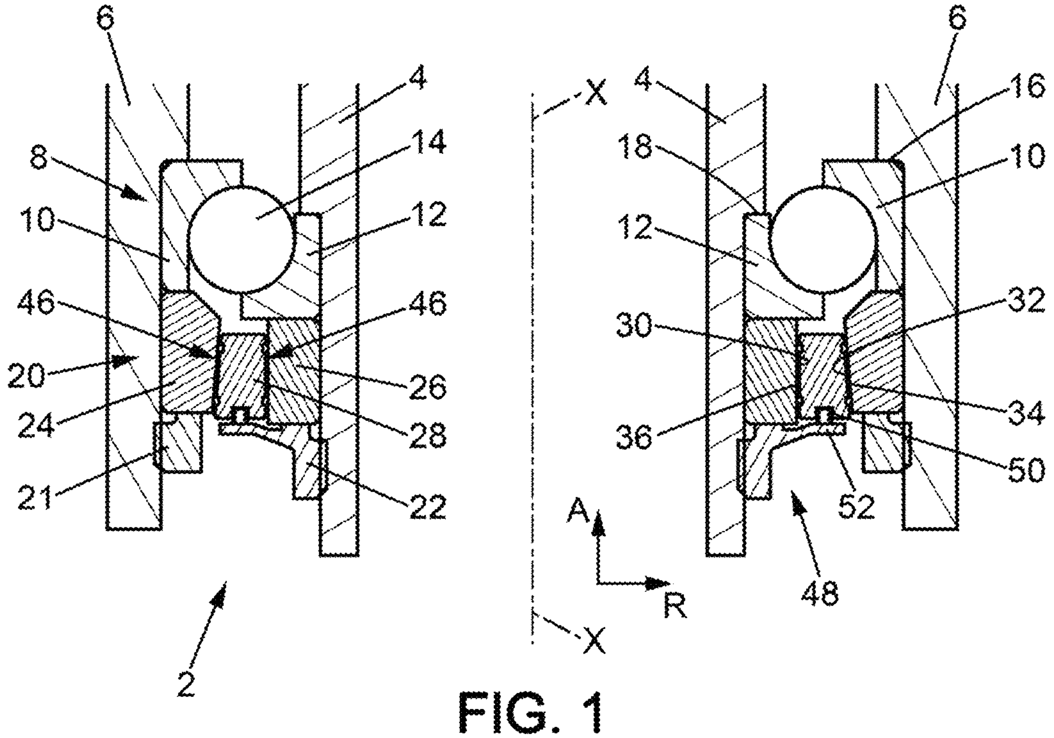
FIG. 1 is a cross-sectional view of an example of a bearing assembly according to a first embodiment of the invention, the cross-section being made in a plane radial to the axis of rotation of the bearing.

With reference to FIG. 1, the bearing assembly 2 comprises a shaft 4 having an axis of rotation X-X extending along an axial direction A, a hub 6 arranged around the shaft, and a bearing 8 mounted between the shaft and the hub.

Bearing 8 comprises an outer bearing race 10 in tight contact against the hub, an inner bearing race 12 in tight contact against the shaft, and rolling elements 14 arranged between the outer bearing race and the inner bearing race.

Outer bearing race 10 abuts against a shoulder 16 provided in the hub. Inner bearing race 12 abuts against a shoulder 18 provided in the shaft. The outer bearing race and the inner bearing race are offset from each other along the axial direction A by a distance that is a function of the size of the rolling elements and of the desired axial positioning of the shaft relative to the hub.

Outer bearing race 10 and inner bearing race 12 each present a face directed towards the rolling elements. This face is called a rolling track. Rolling elements 14 are distributed circularly around the axis of rotation X-X. They are suitable for rolling against the rolling tracks. The rolling tracks present a shape facilitating the movement of rolling elements around the axis of rotation X-X and along the axial A and radial R directions. In the embodiment represented in FIG. 1, rolling elements 14 present a spherical shape. The rolling tracks present the shape of a torus portion.

The assembly also comprises a protective device 20 suitable for protecting the bearing 8 from overloading, an outer nut 21 and an inner nut 22 which are radially configured to attach the bearing and the protective device against the shaft and the hub along the axial direction.

In the embodiment illustrated in FIG. 1, protective device 20 comprises an outer ring 24 in tight contact against the hub, an inner ring 26 in tight contact against the shaft and an intermediate ring 28 situated between the inner ring and the outer ring. Outer ring 24 or inner ring 26 may be referred to as the first ring in the present patent application. Intermediate ring 28 is also referred to as the second ring.

Advantageously, outer bearing race 10, inner bearing race 12 and rolling elements 14 are made of a first material having a first stiffness R1. This stiffness R1 allows for the deformation of rolling elements 14 and/or the deformation of outer bearing race 10 or of inner bearing race 12, within their elastic deformation range, at least until at least one part of intermediate ring 28 makes contact with inner ring 26 or outer ring 24.

Also advantageously, outer ring 24, inner ring 26 and intermediate ring 28 are made of a second material presenting a stiffness R2 that is higher than the stiffness R1 of the first material, at least along the radial direction R. The radial direction R is perpendicular to the axial direction A.

Outer bearing race 10, inner bearing race 12 and rolling elements 14 are, for example, made of a superelastic alloy such as, for example, a Nickel and Titanium alloy (Ni14Ti11), and outer ring 24, inner ring 26 and intermediate ring 28 assembly is made of a steel or a ceramic.

In a variation, outer bearing race 10, inner bearing race 12 and rolling elements 14 are, for example, made of a steel, and outer ring 24, inner ring 26 and intermediate ring 28 assembly is made of a ceramic.

With reference to FIG. 1, outer ring 24 is mounted in abutment against outer bearing race 10. Outer nut 21 is screwed into the hub against outer ring 24. In the same manner, inner ring 26 is mounted in abutment against inner bearing race 12. Inner nut 22 is screwed into the shaft against inner ring 26.

Outer ring 24 and inner ring 26 each present a face which faces intermediate ring 28. This face is known as a supporting face 30, 32 in the present patent application.

Intermediate ring 28 presents at least one circular face 34, 36 having a frustoconical shape. In other words, intermediate ring 28 presents at least one circular face that is inclined relative to the axial direction A (or the X-X axis).

In the embodiment represented in FIG. 1, only outer circular face 34 presents a frustoconical shape. Inner circular face 36 is cylindrical and axial. Supporting faces 30, 32 of the inner ring and outer ring present a shape complementary to the shape of face 34, 36 of the intermediate ring facing them. Thus, in the embodiment represented, supporting face 32 of the outer ring presents a frustoconical shape. Supporting face 30 of the inner ring presents a cylindrical shape.

In a variation, the two circular faces 34, 36 of the intermediate ring present a frustoconical shape. According to another variation, only circular face 36 of the intermediate ring presents a frustoconical shape.

Figure 2:
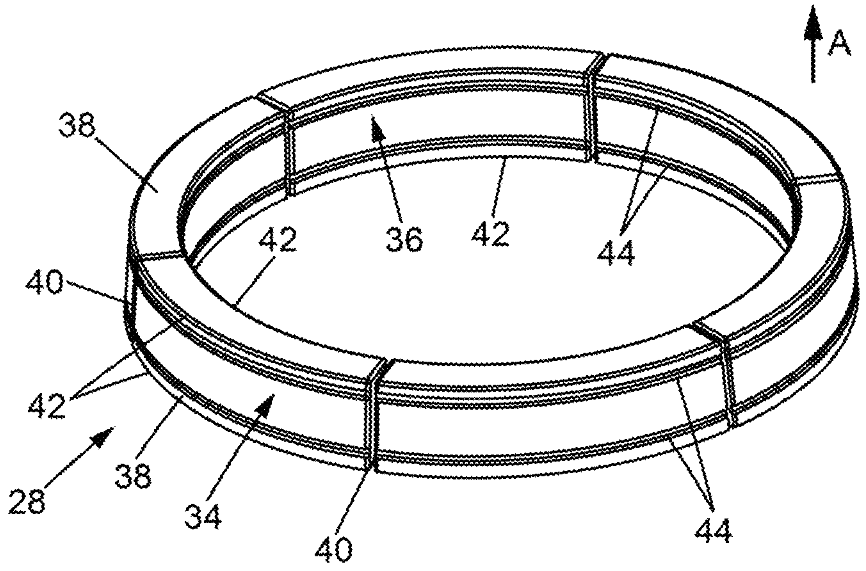
FIG. 2 is a perspective view of an intermediate ring.

Preferably, with reference to FIG. 2, intermediate ring 28 is composed of several ring segments 38 in the form of a circular arc separated by air gaps 40. Preferably, springs or inserts made of an elastic material maintain a regular spacing between these segments. Advantageously, this segmentation prevents jamming of the intermediate ring between the inner ring and the outer ring.

In a variation, intermediate ring 28 may be replaced by an annular alveolate frame holding a series of short blocks having a cross-section similar to segments 38 in FIG. 2.

Preferably, intermediate ring 28 comprises edges 42 that are stripped and rounded according to a profile developed to limit excess edge pressures. For example, edges 42 present the shape of a logarithmic profile or of a clothoid profile.

Also preferably, intermediate ring 28 comprises at least one groove 44 formed on at least one face among outer circular face 34 and inner circular face 36.

In the embodiment represented in FIG. 1, two grooves 44 are formed on outer circular face 34 and two grooves 44 are formed on inner circular face 36. These grooves extend along a plane perpendicular to the axial direction A. In particular, one groove is arranged in the upper part and another groove is arranged in the lower part of each circular face 34, 36 of the intermediate ring.

These grooves prevent jamming of the intermediate ring against inner ring 26 or against outer ring 24.

Advantageously, grooves 44 incorporate a material having a lower stiffness than the material used for the fabrication of the intermediate ring. For example, grooves 44 contain polytetrafluoroethylene. This material also prevents jamming of the intermediate ring against inner ring 26 or against outer ring 24.

In a variation, according to an embodiment that is not represented, grooves 44 comprise leaf springs.

With reference to FIG. 1, bearing assembly 2 also comprises a support 48 supporting intermediate ring 28 and an elastic element 50 attached between the support and the intermediate ring. The elastic element is configured to maintain the intermediate ring at a defined position along the axial direction A such that the intermediate ring is arranged at a distance from inner ring 26 and from outer ring 24. Thus, a clearance 46 is arranged between intermediate ring 28 and inner ring 26 on the one hand, and between intermediate ring 28 and outer ring 24 on the other hand.

Support 48 is fixed to the shaft or to the hub. Support 48 is, for example, composed of a nut provided with a flange 52 extending in a cantilevered manner between the shaft and the hub.

Advantageously, in the embodiment represented, inner nut 22 is provided with a flange. Thus, inner nut 22 supports each ring segment 38. Inner nut 22 ensures both the fixation of the inner ring and of the inner bearing race, and the support function for the flange.

In a variation, flange 52 is integral with outer nut 21. According to another variation, an element different from the inner nut or the outer nut ensures the function of fixing the flange to the shaft or to the hub.

Elastic element 50 is, for example, composed of a spring.

In operation, when a load lower than a threshold load is applied to assembly 2, intermediate ring 28 is arranged between and at a distance from inner ring 26 and outer ring 24. Therefore a clearance 46 exists between the intermediate ring and the inner ring, and a clearance 46 exists between the intermediate ring and the inner ring, as represented in FIG. 1. When the load applied to assembly 2 increases, rolling elements 14 or the inner and outer bearing races deform within their elastic deformation range to support the load applied to the assembly.

If the applied load is higher than the threshold load, intermediate ring 28 comes into contact with at least one part of inner ring 26 and/or outer ring 24. Protective device 20 thus supports the load applied to assembly 2. As outer ring 24, inner ring 26 and intermediate ring 28 are made of a material having a stiffness that is higher than the stiffness of outer race 10, inner race 12 and rolling elements 14, they better withstand the overloads occasionally applied to them.

Figure 3:
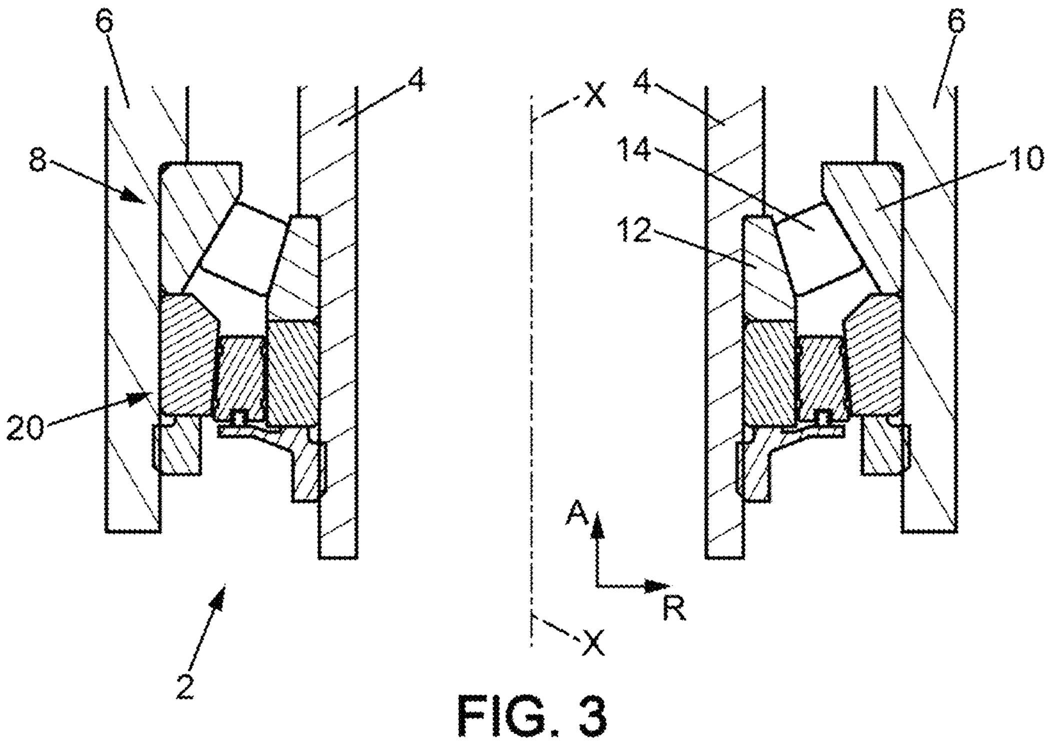
FIG. 3 is a cross-sectional view of a second example of a bearing assembly according to the first embodiment, the cross-section being made in a plane radial to the axis of rotation of the bearing.

In a variation, rolling elements 14 may present a different shape. They may, for example, be composed of cylindrical rollers, tapered rollers or barrel-shaped rollers. Therefore, FIG. 3 represents a bearing assembly according to the invention in which the bearing comprises rolling elements of the tapered roller type instead of the spherical rolling elements 14 represented in FIG. 1.

Figure 4:
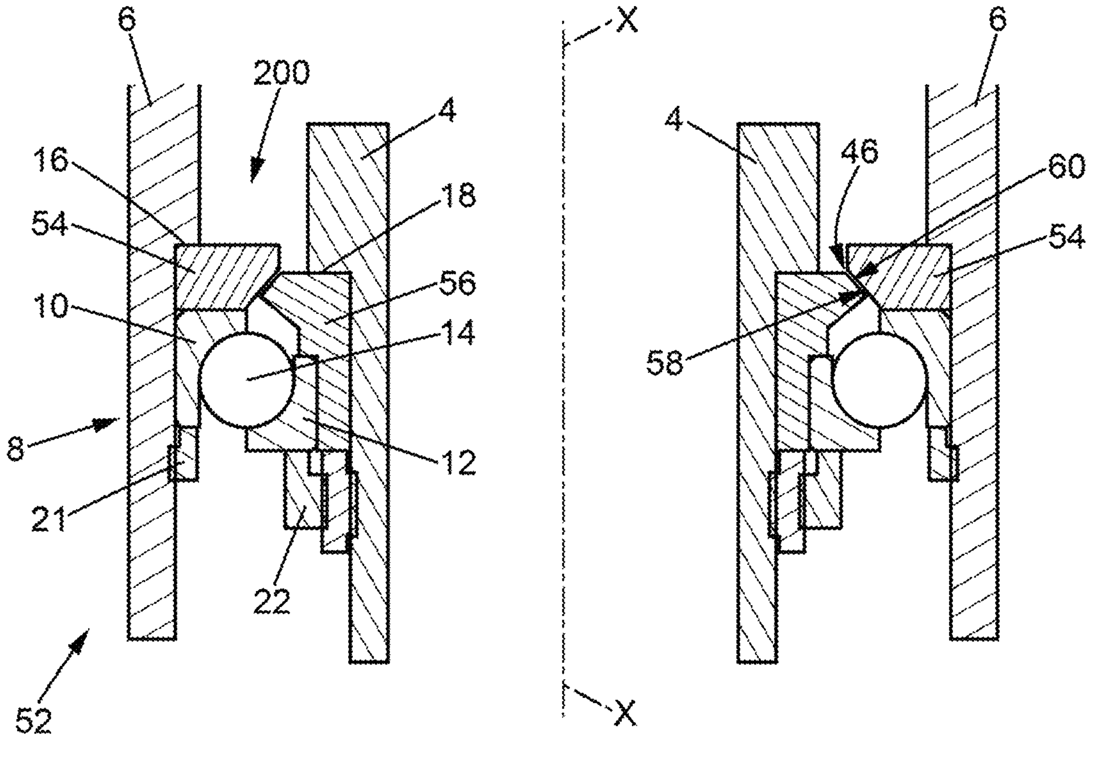
FIG. 4 is a cross-sectional view of a bearing assembly according to a second embodiment of the invention, the cross-section being made in a plane radial to the axis of rotation of the bearing.

FIG. 4 illustrates a bearing assembly 52 according to a second embodiment. This bearing assembly 52 is similar to bearing assembly 2 according to the first embodiment. It will not be described in detail. The technical elements of the second embodiment that are similar or identical to the technical elements of the first embodiment are designated by the same references and will not be described a second time. The protective device 200 illustrated in FIG. 4 comprises a first ring 54 in tight contact against hub 6 and in abutment against shoulder 16, and a second ring 56 in tight contact against shaft 4 and in abutment against shoulder 18. First ring 54 presents a supporting face 58 facing a supporting face 60 of the second ring. A clearance 46 is arranged between supporting face 58 of the first ring and supporting face 60 of the second ring. Preferably, at least one supporting face among supporting faces 58 and 60 is arranged at an angle relative to a cylinder along the X-X axis. Supporting face 58 of first ring 54 is arranged at a distance from supporting face 60 of the second ring, when the bearing assembly is subjected to a load lower than a threshold load. With such a load, the clearance 46 is present between supporting face 58 of first ring 54 and supporting face 60 of the second ring. And, at least one part of first ring 54 makes contact with at least one part of second ring 56, when bearing assembly 52 is subjected to a load higher than said threshold load.

In the embodiment illustrated in FIG. 4, the geometry of device 200 protecting against overloads may be positionally oriented to limit axial overloads.

In a variation, the invention described may be applied to:

roller bearings with cylindrical or spherical and toroidal tracks.

3- or 4-point contact ball bearings.

roller bearings presenting internal play or internal clamping of the rolling elements.

bearings in which extreme forces are not in the same direction as the forces in normal operation.

Advantageously, the assembly according to the invention enables the advantages of a roller bearing and the advantages of a plain bearing to be combined, the first ensuring performance in normal operation while remaining sufficiently elastic to be deformed without damage until making contact with the second, which is stiffer and more resistant to overload.

The invention claimed is:

1. A bearing assembly (2; 52) comprising:

a shaft having an axis of rotation (X-X) extending along an axial direction (A), a hub (6) mounted around the shaft, a bearing (8) comprising an inner bearing race (12) attached to the shaft, an outer bearing race (10) attached to the hub, and rolling elements (14) arranged between the inner bearing race and the outer bearing race, a protective device (20; 200) suitable for protecting the bearing from overloading, the protective device comprising at least one first ring (24, 26; 54) and one second ring (28; 56) which are borne by at least one support from among the shaft and the hub, the first ring (24, 26; 54) being arranged at a distance from the second ring (28; 56) when the bearing assembly is subjected to a load lower than a threshold load; at least one part of the first ring (24, 26; 54) making contact with at least one part of the second ring (28; 56) when the bearing assembly is subjected to a load higher than said threshold load.

2. The bearing assembly (2) according to claim 1, wherein the first ring (24, 26) comprises an inner ring (26) attached to the shaft, the second ring comprising an intermediate ring (28), and wherein the assembly also comprises an outer ring (24) borne by the hub, the intermediate ring (28) being arranged between and at a distance from the inner ring (26) and from the outer ring (24) when the bearing assembly is subjected to a load lower than said threshold load; the intermediate ring (28) making contact with at least one part of at least one ring from among the inner ring (26) and the outer ring (24) when the bearing assembly is subjected to a load higher than said threshold load.

3. The assembly according to claim 2, wherein the inner bearing race (12), the outer bearing race (10) and the rolling elements (14) are made of a first material having a first stiffness (R1), and wherein the inner ring (26), the outer ring (24) and the intermediate ring (28) are made of a second material that is different from the first material, the second material presenting a second stiffness (R2) that is greater than the first stiffness (R1) of the first material at least along a radial direction (R), the radial direction (R) being perpendicular to the axial direction (A).

4. The assembly according to claim 3, wherein the first stiffness (R1) of the first material allows for the deformation of the rolling elements (14) and/or of the at least one race from among the inner bearing race (12) and the outer bearing race (10), within their elastic deformation range, at least until at least one part of the intermediate ring (28) makes contact with one from among the inner ring (26) and the outer ring (24).

5. The assembly according to claim 3, wherein the intermediate ring (28) comprises at least one groove (44) situated on at least one face (34, 36) from among a face facing the inner ring and a face facing the outer ring, the groove (44) extending in a plane perpendicular to the axial direction (A).

6. The assembly according to claim 5, wherein said groove (44) comprises a third material having a third stiffness (R3) that is lower than the second stiffness (R2) of the second material.

7. The assembly according to claim 6, wherein said third material is polytetrafluoroethylene.

8. The assembly according to claim 5, wherein the groove (44) comprises a leaf spring.

9. The assembly according to claim 2, wherein the intermediate ring (28) presents at least one circular face (34, 36) with a frustoconical shape, and wherein the inner ring (26) and the outer ring (24) present a supporting face (30, 32) facing the intermediate ring, said supporting face (30, 32) having a shape complementary to the shape of the intermediate ring.

10. The assembly according to claim 2, wherein the intermediate ring (28) is composed of several ring segments (38) in the shape of a circular arc, separated from each other by gaps (40).

11. The assembly according to claim 2, which comprises:

at least one support (48) suitable for bearing the intermediate ring (28), the support being attached to one among the shaft and the hub, and an elastic element (50) suitable for acting between the support (48) and the intermediate ring (28), the elastic element (50) being configured to maintain the intermediate ring at a position defined along the axial direction (A).

12. The assembly according to claim 11, wherein the support (48) comprises a nut (21, 22) equipped with a flange (52) extending in a cantilevered manner between the shaft and the hub, the nut (21, 22) being suitable for attaching a ring from among the outer ring (24) and the inner ring (26) in abutment against a bearing race from among the outer bearing race (10) and the inner bearing race (12).

13. The assembly according to claim 11, wherein the elastic element (50) is a spring, said spring being attached to the support (48) and to the intermediate ring (28).

14. The assembly according to claim 2, wherein the intermediate ring (28) comprises rounded edges (42).

15. The assembly according to claim 14, wherein the intermediate ring (28) comprises edges presenting the shape of a logarithmic profile or of a clothoid profile.

16. The assembly according to claim 2 wherein the inner bearing race (12), the outer bearing race (10) and the rolling elements (14) are made of a superelastic alloy, and wherein the inner ring (26), the outer ring (24) and the intermediate ring (28) are made of a material from among a steel and a ceramic.

17. The assembly according to claim 2, wherein the inner bearing race (12), the outer bearing race (10) and the rolling elements (14) are made of a steel, and the inner ring (26), the outer ring (24) and the intermediate ring (28) are made of ceramic.

18. The assembly according to claim 2, wherein the inner bearing race (12) and respectively the outer bearing race (10) of the bearing are contiguous along the axial direction (5) with the inner ring (26) and respectively with the outer ring (24) of the protective device.

* * * * *